(12) United States Patent
Mieda et al.

(10) Patent No.: US 12,443,018 B2
(45) Date of Patent: Oct. 14, 2025

(54) OPTICAL MODULE (71) Applicant: NEC Corporation, Tokyo (JP)

(72) Inventors: Shigeru Mieda, Tokyo (JP); Isao Tomita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 294 days.

(21) Appl. No.: 18/122,595

(22) Filed: Mar. 16, 2023

(65) Prior Publication Data

US 2023/0383925 A1 Nov. 30, 2023

(30) Foreign Application Priority Data

May 27, 2022 (JP) .................... 2022-086668

(51) Int. Cl.
*H04B 10/50* (2013.01)
*G02B 17/02* (2006.01)
*G02B 17/06* (2006.01)
*G02B 19/00* (2006.01)

(52) U.S. Cl.
CPC ....... *G02B 17/023* (2013.01); *G02B 17/0673* (2013.01); *G02B 19/0052* (2013.01); *H04B 10/501* (2013.01)

(58) Field of Classification Search
CPC .................................. H04B 10/501–50597
See application file for complete search history.

(56) References Cited

U.S. PATENT DOCUMENTS

| | | | | |
|---|---|---|---|---|
| 4,293,826 A | * | 10/1981 | Scifres | H01S 5/4025 372/50.21 |
| 2005/0057814 A1 | * | 3/2005 | Schrodinger | H04B 10/501 359/639 |
| 2015/0162990 A1 | * | 6/2015 | Daiber | H01S 5/02216 398/183 |
| 2016/0238794 A1 | * | 8/2016 | Tang | G02B 6/4214 |
| 2017/0019181 A1 | * | 1/2017 | Flintham | G02B 6/4213 |
| 2017/0093502 A1 | * | 3/2017 | Neuner, III | H04B 13/02 |
| 2017/0195058 A1 | * | 7/2017 | Wang | H04B 10/505 |
| 2018/0299630 A1 | * | 10/2018 | Son | G02B 6/42 |

FOREIGN PATENT DOCUMENTS

JP 2000-101517 A 4/2000

* cited by examiner

*Primary Examiner* — Nathan M Cors

(57) ABSTRACT

To provide an optical module that can further be reduced in size, an optical module according to the present invention includes a casing, a light source that is mounted on a first surface of the casing and outputs light, a first reflection means that is arranged at a position facing the light source and reflects the light from the light source to a direction vertical to the first surface, a second reflection means that reflects the light from the first reflection means to a direction parallel to an output direction of the light from the light source, and a transmission means that transmits the light from the second reflection means.

7 Claims, 8 Drawing Sheets

OPTICAL MODULE

This application is based upon and claims the benefit of priority from Japanese Patent Application No. 2022-086668, filed on May 27, 2022, the disclosure of which is incorporated herein in its entirety by reference.

TECHNICAL FIELD

The present invention relates to an optical module that outputs light.

BACKGROUND ART

For optical communication, an optical module for sending an optical signal is used. For example, as the above-mentioned optical module, a nano integrable tunable laser assembly (ITLA) is used. A transmission means such as a laser or a lens is included in the optical module.

For example, JP 2000-101517 A discloses a technique of reflecting light being output from a laser light source in an optical communication device, inside the optical communication device, and then emitting the light from the optical communication device.

SUMMARY

In recent years, size reduction of an optical module has further been demanded. However, in the optical communication device described in JP 2000-101517 A, each transmission means cannot be arranged through efficient use of a space in an optical module. As a result, there is a difficulty in reducing a size of an optical module.

The present invention has been made in view of the above-mentioned problem, and an object of the present invention is to reduce a size of an optical module that outputs light.

An optical module according to the present invention includes:
 a casing;
 a light source configured to be mounted on a first surface of the casing and output light;
 a first reflector configured to reflect the light from the light source to a direction vertical to the first surface, the first reflector being arranged at a position facing the light source;
 a second reflector configured to reflect the light from the first reflector to a direction parallel to an output direction of the light from the light source; and
 a transmitter configured to transmit the light from the second reflector.

According to the present invention, an optical module that outputs light is able to be reduced in size.

BRIEF DESCRIPTION OF THE DRAWINGS

Exemplary features and advantages of the present invention will become apparent from the following detailed description when taken with the accompanying drawings in which.

EXAMPLE EMBODIMENT

First Example Embodiment

Figure 1:
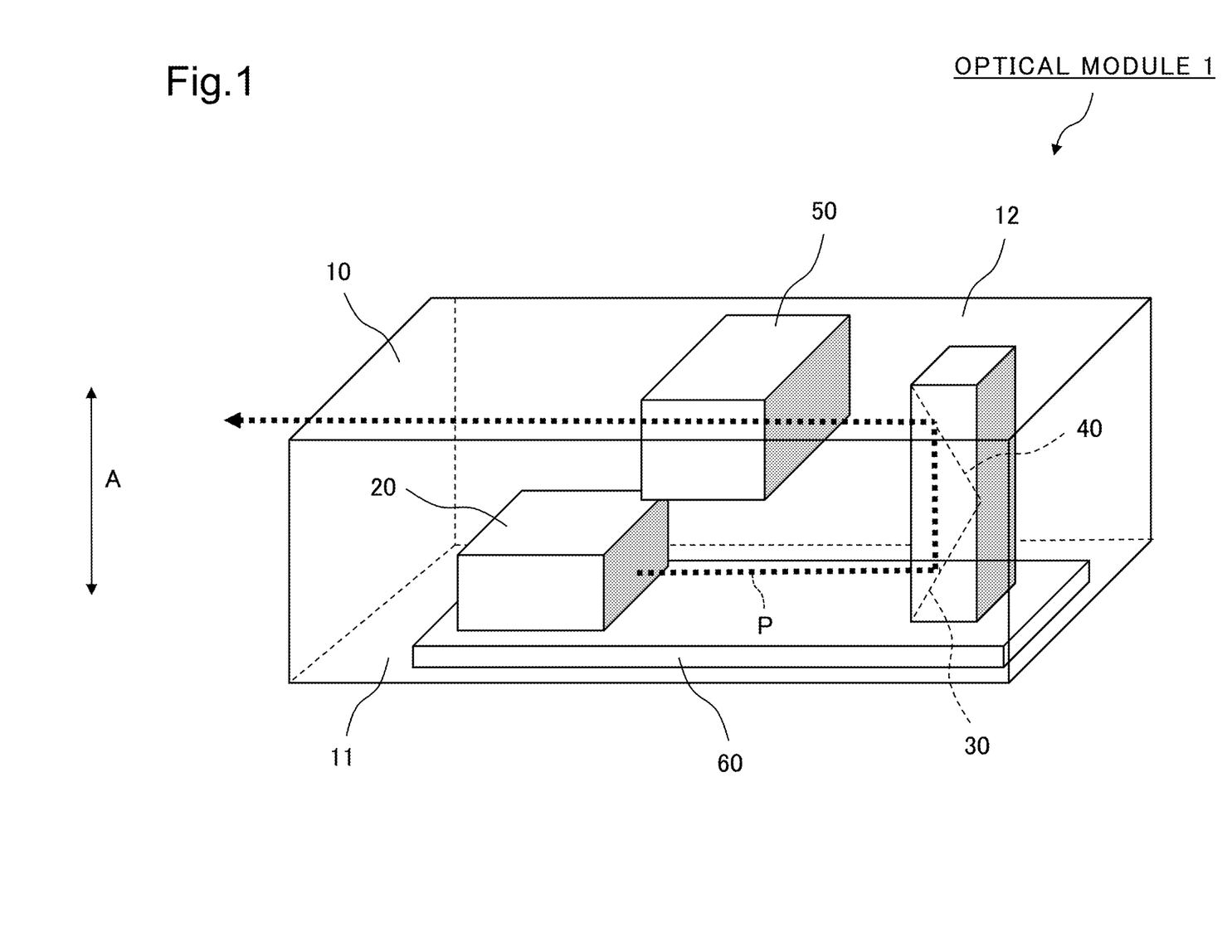
FIG. 1 is a block diagram illustrating a configuration example of an optical module according to a first example embodiment of the present invention.

With reference to FIG. 1, an optical module 1 according to a first example embodiment is described. FIG. 1 is a block diagram illustrating a configuration example of the optical module 1. Note that the arrow A in FIG. 1 indicates a perpendicular direction. Further, the arrow P in FIG. 1 indicates an optical path of light that is output from a light source 20.

A configuration of the optical module 1 is described. As illustrated in FIG. 1, the optical module 1 includes a casing 10, the light source 20, a first reflection means 30, a second reflection means 40, a transmission means 50, and a base board 60. The base board 60 is not an essential constituent element of the present invention.

As illustrated in FIG. 1, the casing 10 has a first surface 11 and a second surface 12. The first surface 11 and the second surface 12 are surfaces that face each other in a vertical direction with respect to the first surface 11. As illustrated in FIG. 1, the casing 10 accommodates the light source 20, the first reflection means 30, the second reflection means 40, the transmission means 50, and the base board 60.

The light source 20 is mounted on the first surface 11 of the casing and outputs light. Specifically, as illustrated in FIG. 1, the light source is fixed on the base board 60 mounted on the first surface 11, and is thereby mounted on the first surface 11 of the casing 10. In other words, the light source 20 is mounted on the first surface 11 of the casing 10 via the base board 60. Note that the light source 20 may directly be mounted on the first surface 11 of the casing 10. The light source 20 outputs light in a direction parallel to the first surface 11. The light source 20 is a laser diode, for example.

The first reflection means 30 is arranged at a position facing the light source 20, and reflects the light from the light source 20 in a direction vertical to the first surface 11. For example, the first reflection means 30 is a mirror provided on the base board 60. The light reflected by the first reflection means 30 enters the second reflection means 40.

The second reflection means 40 reflects the light from the first reflection means 30 in a direction parallel to the output direction of the light from the light source 20. For example, the second reflection means reflects the incident light from the first reflection means 30 to the transmission means 50. For example, the second reflection means 40 is a mirror provided on the base board 60. Note that the first reflection means and the second reflection means 40 may be provided in an integrated manner as illustrated in FIG. 1, or may be provided as separate components.

Note that each of the first reflection means 30 and the second reflection means 40 may be a semi-transmissive mirror. For example, the first reflection means 30 reflects the incident light to the second reflection means 40, and transmits the light at the same time. Further, the second reflection means 40 reflects the incident light to the transmission means 50, and transmits the light at the same time. In this case, the transmitted light enters a light reception means, which is omitted in illustration.

The transmission means 50 transmits the light from the second reflection means 40. The transmission means 50 is a collimator lens or an isolator, for example. When the transmission means 50 is an isolator, the transmission means 50 is a magnetic body. In this case, the transmission means 50 is held, with magnetic force of the transmission means 50, on the second surface 12 facing the first surface 11 or on a surface intersecting the second surface 12 among the surfaces of the casing 10.

When the transmission means 50 is fixed inside the casing 10, the transmission means 50 is fixed on the second surface 12 or the surface intersecting with the second surface 12 among the surfaces of the casing 10 with an adhesive member while being held, with magnetic force of the transmission means 50, on the second surface 12 or on the surface intersecting with the second surface 12 among the surfaces of the casing 10. The adhesive member is a fastening screw or an adhesive agent, for example. The above-mentioned surface intersecting with the second surface 12 among the surfaces of the casing 10 indicates surfaces other than the first surface 11 and the second surface 12 among the surfaces forming the casing 10, for example. With this, a manufacturer of the optical module 1 can use magnetic force to position the transmission means 50 when fixing the transmission means 50 inside the casing 10. As a result, the manufacturer of the optical module 1 can easily manufacture the optical module 1.

The light source 20, the first reflection means 30, and the second reflection means 40 are provided on the base board 60. The base board 60 is a Peltier element, for example.

Figure 2:
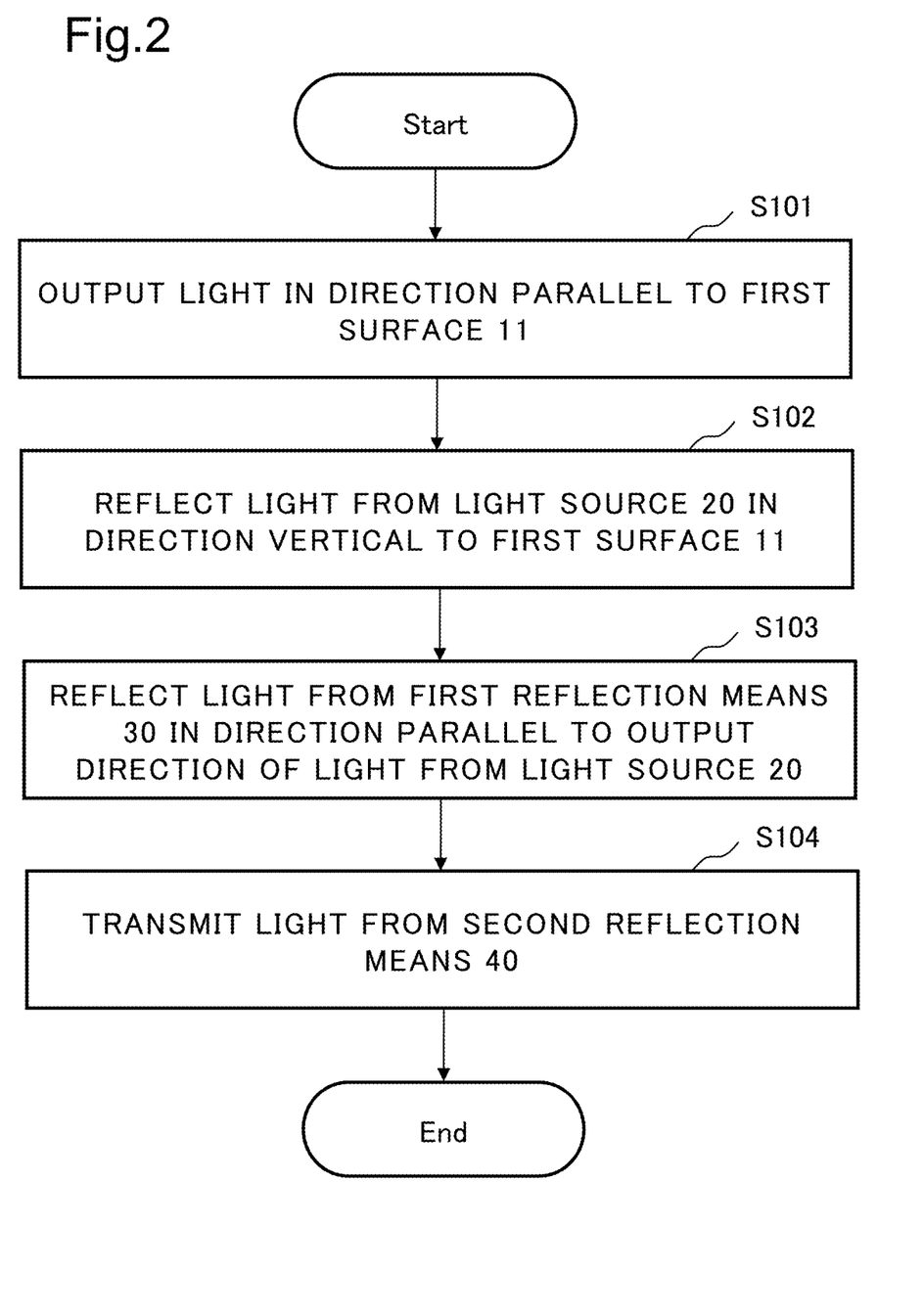
FIG. 2 is a flowchart illustrating an operation example of the optical module according to the first example embodiment of the present invention.

Next, with reference to FIG. 2, an operation of the optical module 1 is described. FIG. 2 is a flowchart illustrating an operation example of the optical module 1. The light source 20 outputs light in the direction parallel to the first surface 11 (S101). The first reflection means 30 reflects the light from the light source 20 in the direction vertical to the first surface 11 (S102). The second reflection means 40 reflects the light from the first reflection means 30 in the direction parallel to the output direction of the light from the light source 20 (S103). The transmission means 50 transmits the light from the second reflection means 40 (S104).

The optical module 1 is described above. As described above, the optical module 1 includes the casing 10, the light source 20, the first reflection means 30, the second reflection means 40, and the transmission means 50. The light source 20 is fixed to the first surface 11 of the casing 10, and outputs light. The first reflection means 30 is arranged at the position facing the light source 20, and reflects the light from the light source 20 in the direction vertical to the first surface 11. The second reflection means 40 reflects the light from the first reflection means 30 in the direction parallel to the output direction of the light from the light source 20. The transmission means 50 transmits the light from the second reflection means 40.

In this way, in the optical module 1, the light that is output from the light source 20 is reflected by the first reflection means 30 in the vertical direction. Then, the second reflection means 40 reflects the light from the first reflection means 30 in the direction parallel to the output direction of the light from the light source 20. Thus, the optical path of the light that is output from the light source 20 passes through the inside of the casing in a three-dimensional manner. As a result, as compared to a case in which an optical path passes on a plane, the optical module 1 enables arrangement of each transmission means through efficient use of a space in the optical module 1. Thus, according to the optical module 1, an optical module that outputs light can be reduced in size.

Figure 3:
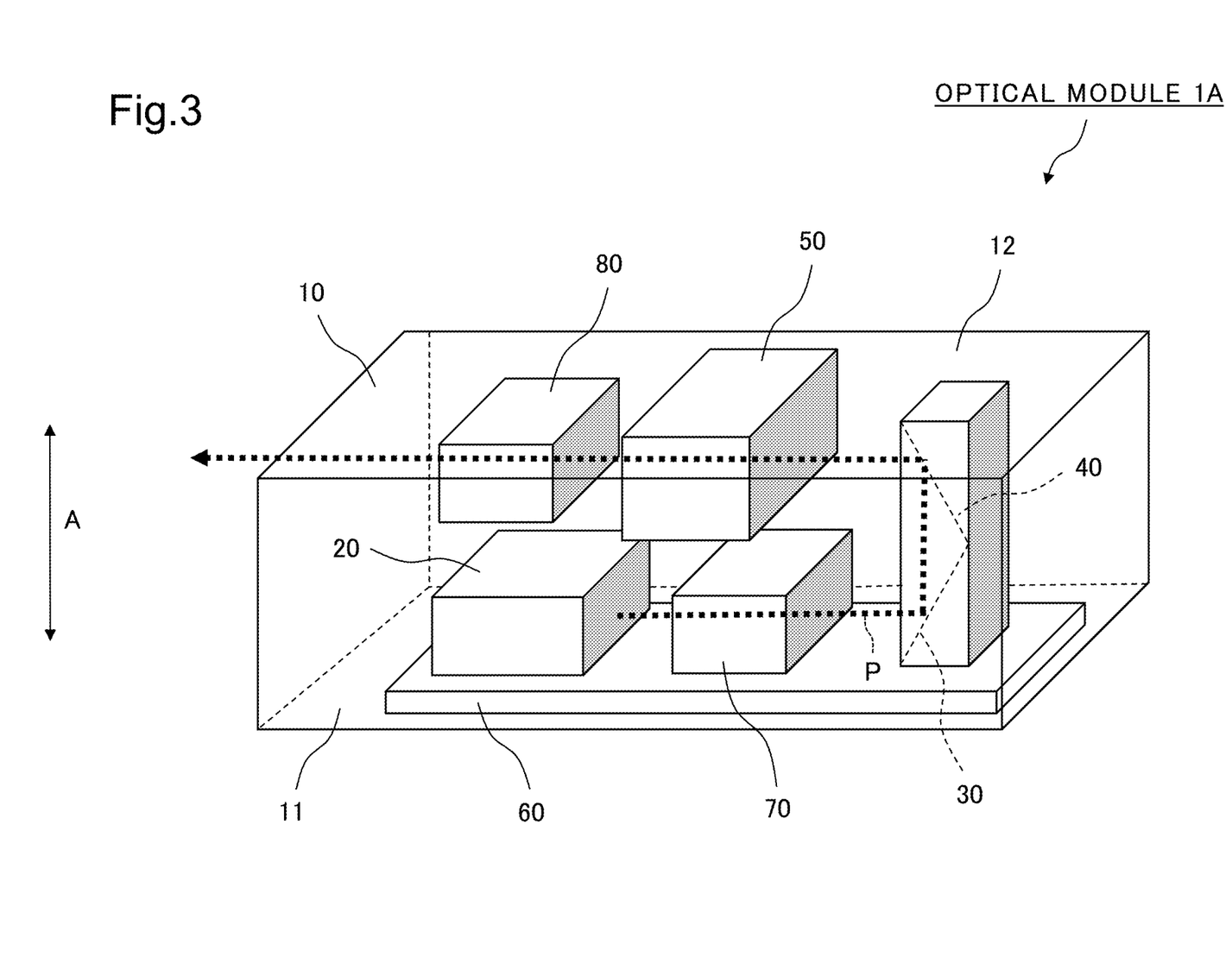
FIG. 3 is a block diagram illustrating a configuration example in a modification example of the first example embodiment of the present invention.

Next, with reference to FIG. 3, a modification example of the first example embodiment is described. FIG. 3 is a block diagram illustrating a configuration example of an optical module 1A. As illustrated in FIG. 3, the optical module 1A includes the casing 10, the light source 20, the first reflection means 30, the second reflection means 40, the transmission means 50, the base board 60, a first lens 70, and a second lens 80. The optical module 1A is different from the optical module 1 in that the first lens 70 and the second lens 80 are provided.

The first lens 70 is a collimator lens, for example. The first lens transmits the light from the light source 20 to the first reflection means 30. Further, the first lens 70 is provided on the base board 60.

The second lens 80 is a condensing lens, for example. The second lens 80 transmits the light from the transmission means 50 to an outside of the casing 10. Further, the second lens 80 is bonded to the second surface 12 of the casing 10, for example.

The first lens 70 and the second lens 80 that are described above may be other optical components. Example of the other optical components include optical filters.

Figure 4:
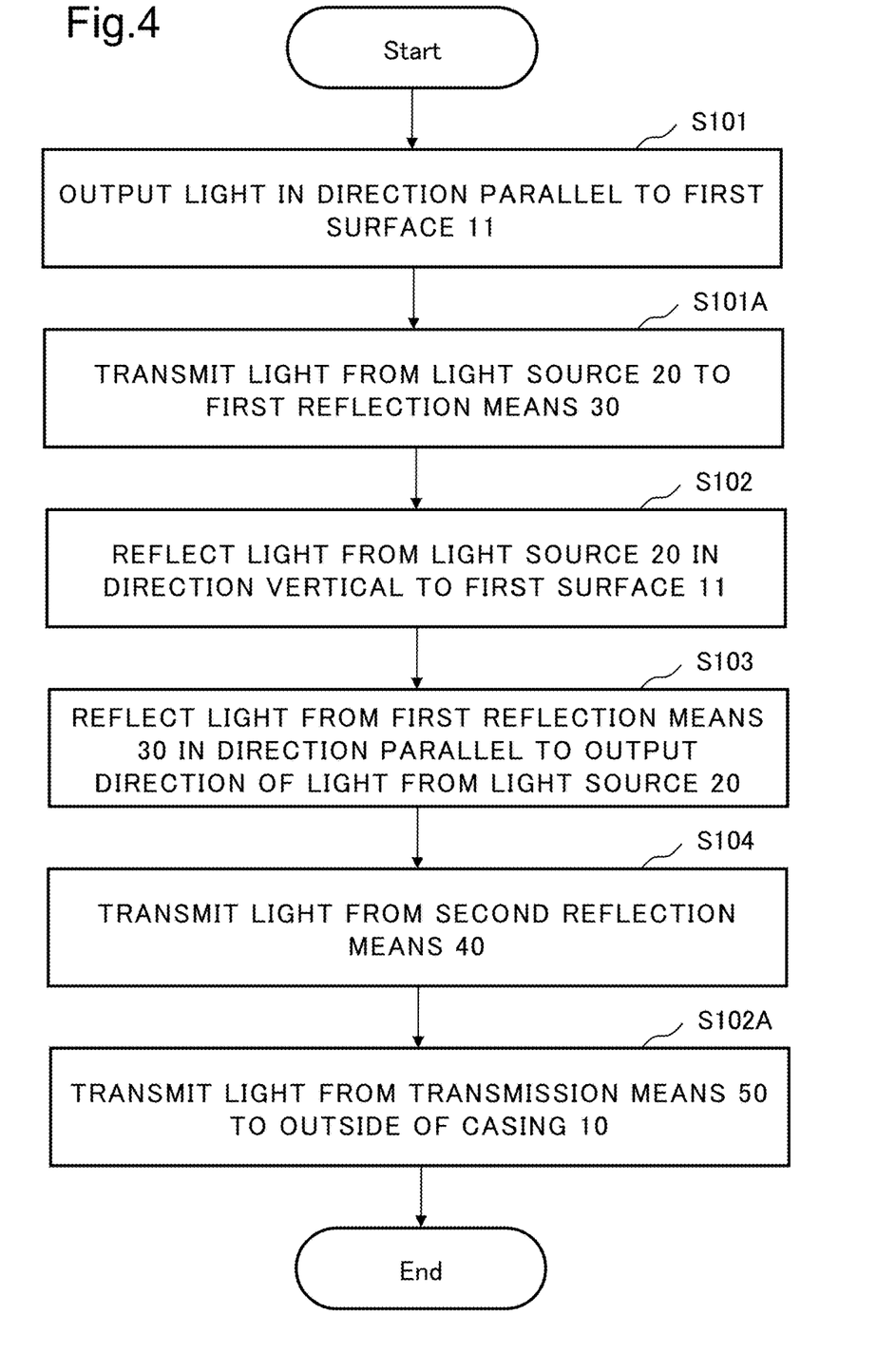
FIG. 4 is a flowchart illustrating an operation example in the modification example of the first example embodiment of the present invention.

Next, with reference to FIG. 4, an operation of the optical module 1A is described. FIG. 4 is a flowchart illustrating an operation example of the optical module 1A. The light source 20 outputs light in the direction parallel to the first surface 11 (S101). The first lens 70 transmits the light from the light source 20 to the first reflection means 30 (S101A). The first reflection means 30 reflects the light from the light source 20 in the direction vertical to the first surface 11 (S102). The second reflection means 40 reflects the light from the first reflection means 30 in the direction parallel to the output direction of the light from the light source 20 (S103). The transmission means 50 transmits the light from the second reflection means 40 (S104). The second lens 80 transmits the light from the transmission means 50 to the outside of the casing 10 (S102A).

The optical module 1A includes constituent elements similar to those of the optical module 1. Thus, similarly to the optical module 1, the optical module 1A enables size reduction of an optical module that outputs light.

Second Example Embodiment

Figure 5:
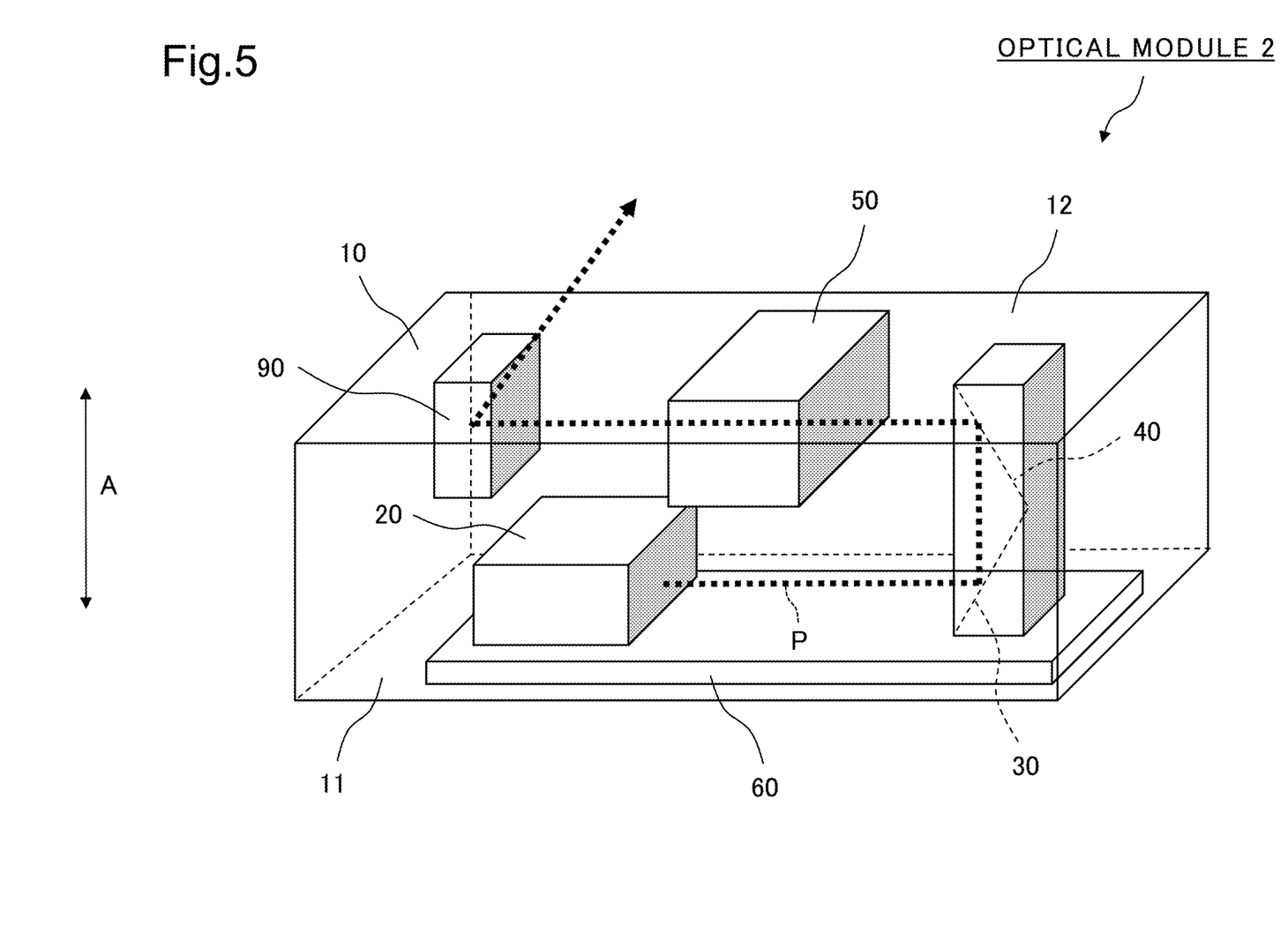
FIG. 5 is a block diagram illustrating a configuration example of an optical module according to a second example embodiment of the present invention.

Next, with reference to FIG. 5, a second example embodiment is described. FIG. 5 is a block diagram illustrating a configuration example of an optical module 2. As illustrated in FIG. 5, the optical module 2 includes a casing 10, a light source 20, a first reflection means 30, a second reflection means 40, a transmission means 50, a base board 60, and a third reflection means 90. The optical module 2 is different from the optical module 1 in that the third reflection means 90 is provided.

The third reflection means 90 reflects the light from the transmission means 50, and outputs the light to an outside of the casing 10. Note that, although the third reflection means 90 reflects the light in a depth direction in FIG. 5, a light reflection direction is not limited thereto. For example, the third reflection means 90 may reflect the light to the first surface 11 or the second surface 12. For example, the third reflection means 90 is a mirror that is mounted on the second surface 12 of the casing 10.

Note that the third reflection means 90 may be a semi-transmissive mirror. For example, the third reflection means 90 reflects the incident light to the outside of the casing 10, and transmits the light at the same time. In this case, the transmitted light enters a light reception means, which is omitted in illustration.

Figure 6:
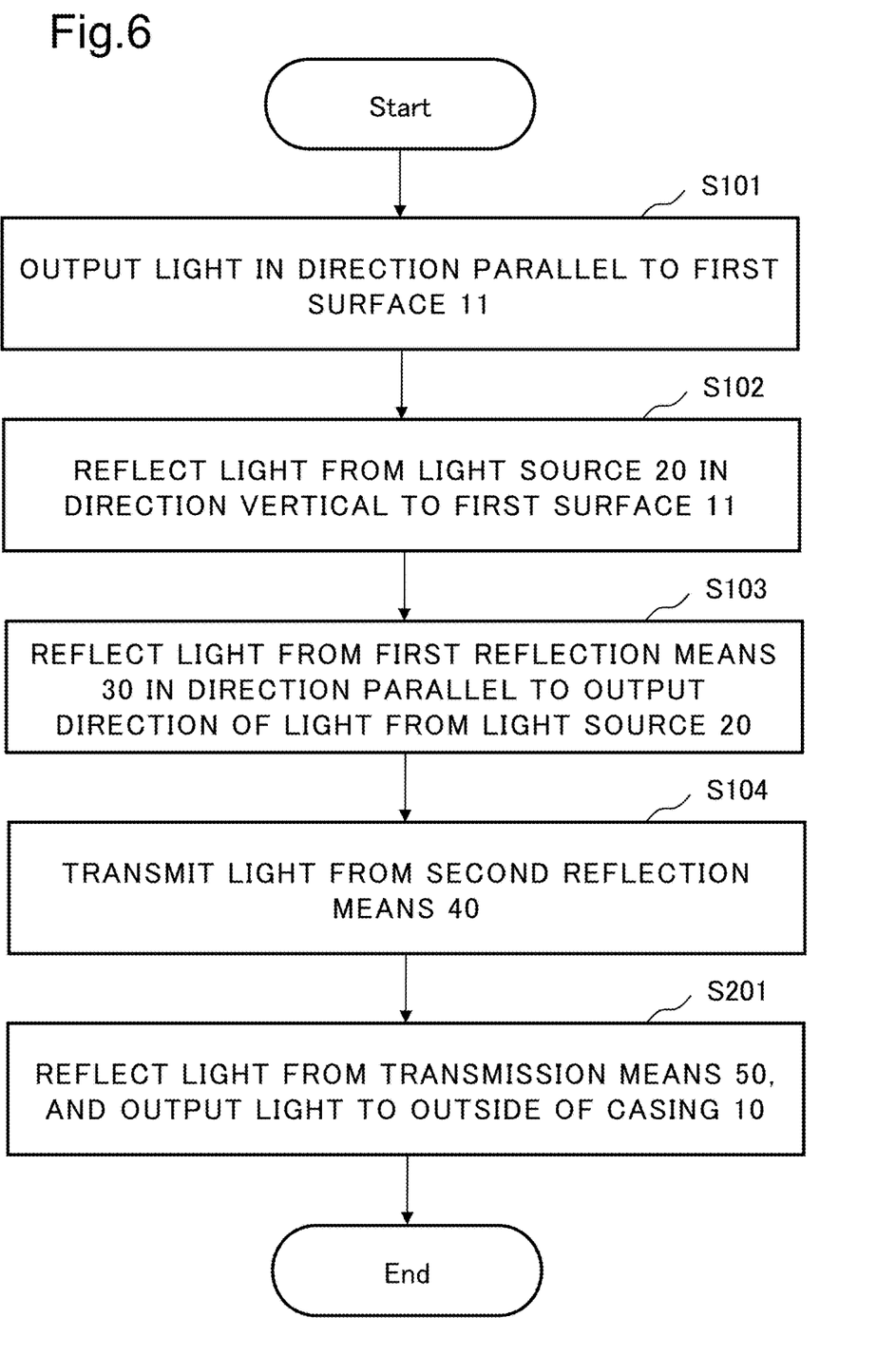
FIG. 6 is a flowchart illustrating an operation example of the optical module according to the second example embodiment of the present invention.

Next, with reference to FIG. 6, an operation of the optical module 2 is described. FIG. 6 is a flowchart illustrating an operation example of the optical module 2. The light source 20 outputs light in a direction parallel to the first surface 11 (S101). The first reflection means 30 reflects the light from the light source 20 in a direction vertical to the first surface 11 (S102). The second reflection means 40 reflects the light from the first reflection means 30 in a direction parallel to the output direction of the light from the light source 20 (S103). The transmission means 50 transmits the light from the second reflection means 40 (S104). The third reflection means 90 reflects the light from the transmission means 50, and outputs the light to the outside of the casing 10 (S201).

The optical module 2 includes the third reflection means 90, and thus is capable of changing a direction in which the light is emitted.

Further, the optical module 2 includes constituent elements similar to those of the optical module 1. Thus, similarly to the optical module 1, the optical module 2 enables size reduction of an optical module that outputs light.

Note that, similarly to the optical module 1A, the optical module 2 may include a first lens 70 and a second lens 80.

Third Example Embodiment

Figure 7:
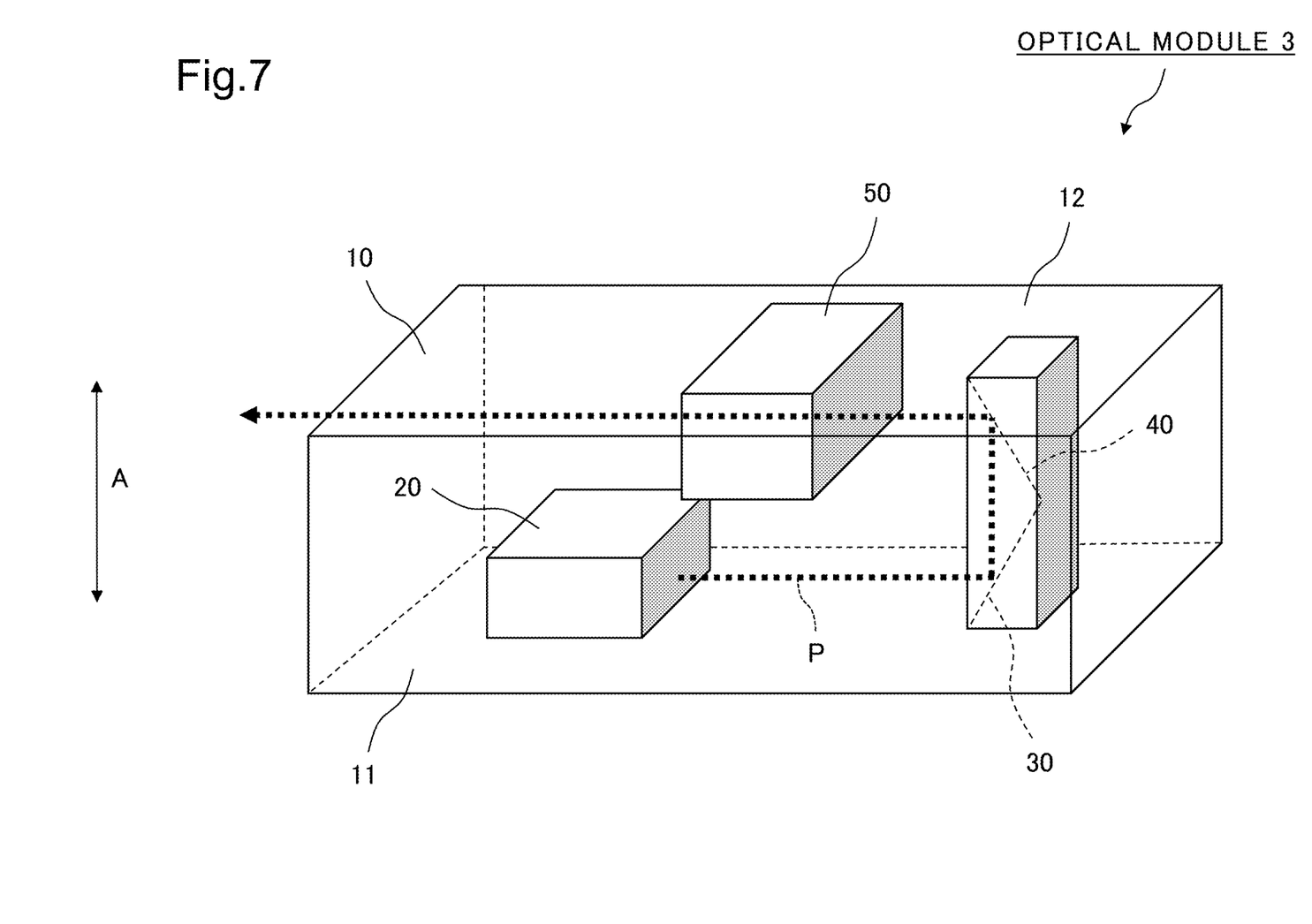
FIG. 7 is a block diagram illustrating a configuration example of an optical module according to a third example embodiment of the present invention.

With reference to FIG. 7, an optical module 3 according to a third example embodiment is described. FIG. 7 is a block diagram illustrating a configuration example of the optical module 3. Note that the arrow A in FIG. 7 indicates a perpendicular direction. Further, the arrow P in FIG. 7 indicates an optical path of light that is output from a light source 20.

A configuration of the optical module 3 is described. As illustrated in FIG. 7, the optical module 3 includes a casing 10, the light source 20, a first reflection means 30, a second reflection means 40, and a transmission means 50.

The light source 20 is mounted on the first surface 11 of the casing and outputs light. The first reflection means 30 is arranged at a position facing the light source 20, and reflects the light from the light source 20 in a direction vertical to the first surface 11. The second reflection means 40 reflects the light from the first reflection means 30 in a direction parallel to the output direction of the light from the light source 20. The transmission means 50 transmits the light from the second reflection means.

Figure 8:
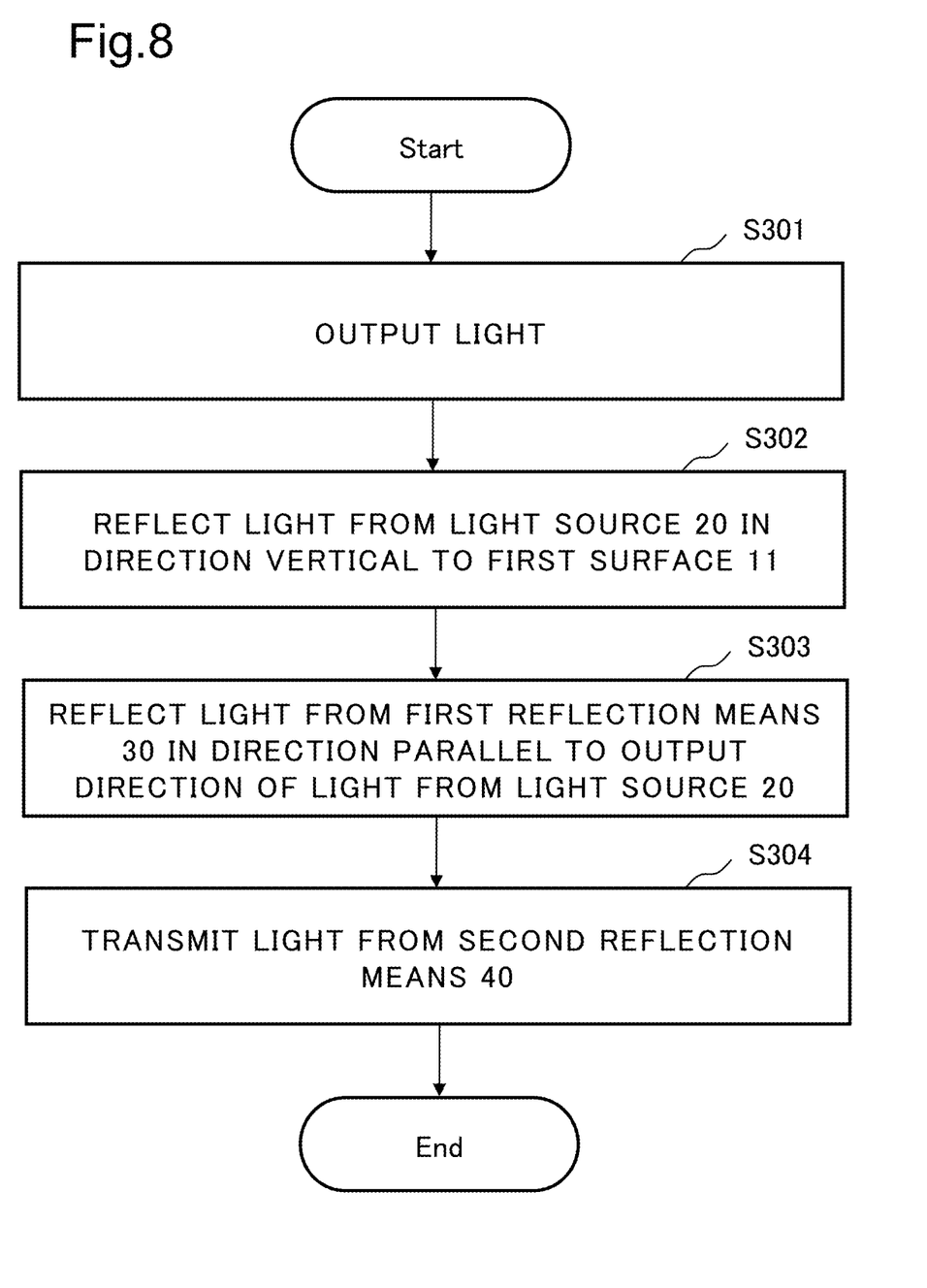
FIG. 8 is a flowchart illustrating an operation example of the optical module according to the third example embodiment of the present invention.

Next, with reference to FIG. 8, an operation of the optical module 3 is described. FIG. 8 is a flowchart illustrating an operation example of the optical module 3. The light source 20 outputs light (S301). The first reflection means 30 reflects the light from the light source 20 in the direction vertical to the first surface 11 (S302). The second reflection means 40 reflects the light in the direction parallel to the output direction of the light from the light source 20 (S303). The transmission means 50 transmits the light from the second reflection means 40 (S304).

The optical module 3 is described above. As described above, the optical module 3 includes the casing 10, the light source 20, the first reflection means 30, the second reflection means 40, and the transmission means 50. The light source 20 is fixed to the first surface 11 of the casing and outputs light. The first reflection means 30 is arranged at the position facing the light source 20, and reflects the light from the light source 20 in the direction vertical to the first surface 11. The second reflection means 40 reflects the light from the first reflection means 30 in the direction parallel to the output direction of the light from the light source 20. The transmission means 50 transmits the light from the second reflection means 40.

In this way, in the optical module 3, the light that is output from the light source 20 is reflected by the first reflection means 30 in the perpendicular direction. Thus, the optical path of the light that is output from the light source 20 passes through the inside of the casing 10 in a three-dimensional manner. As a result, as compared to a case in which an optical path passes on a plane, the optical module 3 enables arrangement of each transmission means through efficient use of a space in the optical module 3. Thus, according to the optical module 3, an optical module that outputs light can be reduced in size.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An optical module comprising:
   a casing;
   a light source configured to be mounted on a first surface of the casing and output light;
   a first reflector configured to reflect the light from the light source to a direction vertical to the first surface, the first reflector being arranged at a position facing the light source;
   a second reflector configured to reflect the light from the first reflector to a direction parallel to an output direction of the light from the light source; and
   a transmitter configured to transmit the light from the second reflector, wherein,
   the transmitter is a magnetic body, and is held, with magnetic force of the transmitter, on a second surface facing the first surface among surfaces of the casing or on a surface intersecting with the second surface among surfaces of the casing.

2. The optical module according to claim 1, wherein
   the transmitter is a magnetic body, and is fixed with an adhesive member on the second surface or a surface intersecting with the second surface among surfaces of the casing under a state of being held, with magnetic force of the transmitter, on the second surface or on a surface intersecting with the second surface among surfaces of the casing.

3. The optical module according to claim 1, further comprising:
   a third reflector configured to reflect the light transmitted through the transmitter and output the light to an outside of the casing.

4. The optical module according to claim 1, wherein the light source outputs the light in a direction parallel to the first surface.

5. The optical module according to claim 2, further comprising:
a third reflector configured to reflect the light transmitted through the transmitter and output the light to an outside of the casing.

6. The optical module according to claim 1, wherein the light source outputs the light in a direction parallel to the first surface.

7. The optical module according to claim 2, wherein the light source outputs the light in a direction parallel to the first surface.

* * * * *